United States Patent [19]
Hofler et al.

[11] Patent Number: 4,959,539
[45] Date of Patent: Sep. 25, 1990

[54] FLEXURAL DISK FIBER OPTIC HYDROPHONE

[75] Inventors: Thomas J. Hofler, Monterey; Steven L. Garrett, Pebble Beach, both of Calif.

[73] Assignee: The United States of America as represented by the Secretary of the Navy, Washington, D.C.

[21] Appl. No.: 326,819

[22] Filed: Mar. 20, 1989

[51] Int. Cl.$^5$ .................. G01D 5/34; H01J 5/16; G01B 9/02
[52] U.S. Cl. ..................... 250/227.19; 250/231.10
[58] Field of Search ............. 250/227, 231 R, 231 P, 250/227.19, 231.10; 356/345, 350; 73/653, 657, 705

[56] References Cited

U.S. PATENT DOCUMENTS

| | | | |
|---|---|---|---|
| 4,162,397 | 7/1979 | Bucaro et al. | 350/96.29 |
| 4,534,222 | 8/1985 | Finch et al. | 73/653 |
| 4,564,289 | 1/1986 | Spillman, Jr. | 250/231 P |
| 4,577,100 | 3/1986 | Meltz et al. | 250/231 P |
| 4,588,886 | 5/1986 | Snider | 250/231 P |
| 4,613,752 | 9/1986 | Davis | 250/277 |
| 4,799,202 | 1/1989 | Assard | 356/345 |
| 4,799,752 | 1/1989 | Carome | 356/345 |

OTHER PUBLICATIONS

T. D. Sullivan and J. M. Powers, "Piezoelectric Polymer Flexural Disk Hydrophone", *Journal Acoustic Society of America;* vol. 63, No. 5, May 1978, pp. 1396–1401.

D. Ricketts, "Model for a Piezoelectric Polymer Flexural Plate Hydrophone", *Journal Acoustic Society of America;* vol. 70, No. 4, Oct. 1981, pp. 929–935.

*Primary Examiner*—David C. Nelms
*Assistant Examiner*—Michael Messinger
*Attorney, Agent, or Firm*—Sol Sheinbein; Melvin J. Sliwka; Stephen J. Church

[57] ABSTRACT

A hydrophone or other acoustic vibration sensing apparatus having a disk circumferentially supported for flexure induced by acoustic vibrations and wound on each side with a flat spiral of optical fiber fixedly attached to the disk side so that flexure of the disk due to the vibrations lengthens the spiral on one side and shortens the spiral on the other side. The spirals are connected as two legs of a fiber optic interferometer to provide an output corresponding to the vibrations while canceling errors due to pressure and temperature effects common to the legs. A pair of the disks and associated optical fiber spirals may be mounted on opposite ends of a body with the outer spirals connected as one interferometer leg and the inner spirals as another leg to cancel differences in the lengths of the legs due to acceleration induced flexure of the disks and to provide double the sensitivity to pressure differential of a single disk.

12 Claims, 2 Drawing Sheets

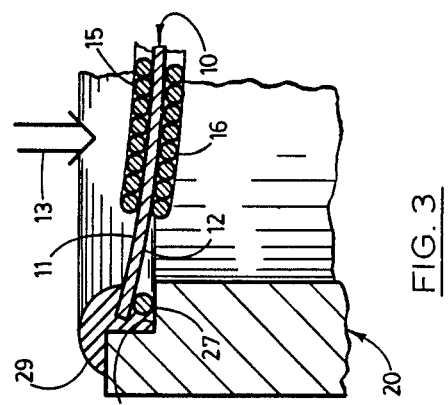
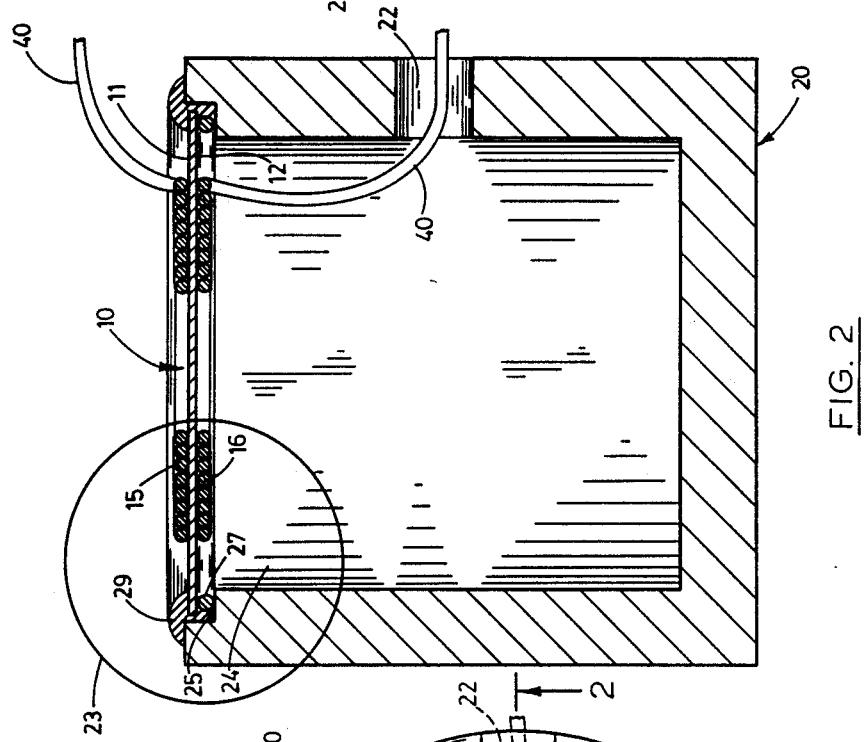
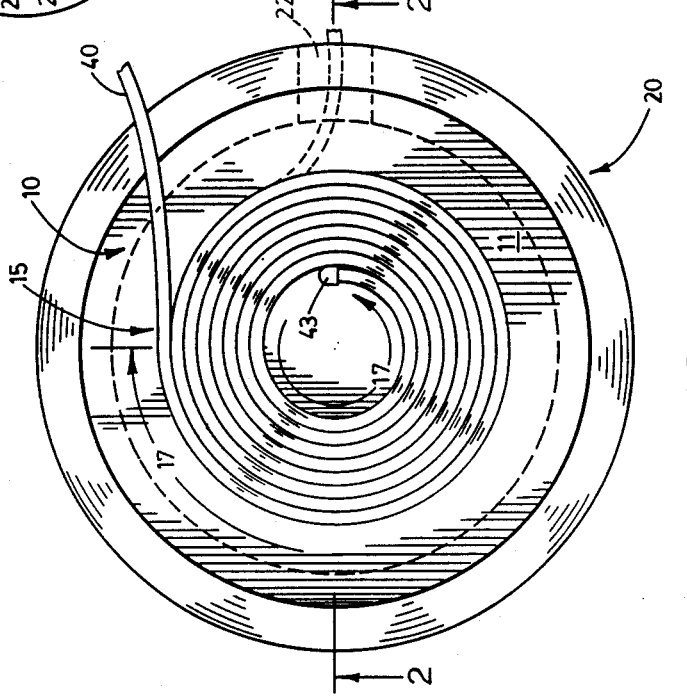

FLEXURAL DISK FIBER OPTIC HYDROPHONE

BACKGROUND OF THE INVENTION

1. Field of the Invention

This invention relates to acoustic vibration sensing apparatus having a light transmitting fiber.

2. Description of the Prior Art

Many sensors for acoustic vibrations and other fluid pressure effects are well known and have various deficiencies such as low sensitivity, high cost, limited maximum pressure, and errors due to temperature, pressure, and acceleration. The flexure or strain of an elastic disk subjected to an axial pressure difference is a well-known basis for acoustic and other pressure measurements, the amount of flexure typically being determined mechanically, piezoelectrically, or by changes in capacitance and resistance of elements associated with the disc. It is apparent that axial acceleration of the disk causes flexure thereof indistinguishable from flexure due to pressure differential, and all strain measuring devices have errors due to temperature caused changes in length or other dimensions, modulus of elasticity, index of refraction, and the like.

Interferometer measurements of strain can provide great resolution and, when carried out with an optical fiber, can provide a simple and rugged sensor which requires low power, is immune to many forms of interference, and is adapted to remote sensing of pressure variations and to high data rates. However, optical fibers are relatively insensitive per unit length when used for measurement of pressure variations and are subject to errors due to ambient pressure, tension from acceleration, and the like. Interferometers having an optical fiber leg are particularly subject to error due to variation of the length of the leg caused by temperature. Increase in leg length to provide greater sensitivity typically increases such errors proportionately. It is known to minimize these errors by a "push-pull" arrangement of a pair of interferometer optical fiber legs where a change in a measured variable shortens one leg and lengthens the other while both legs change length together with variations in temperature, pressure, and acceleration. However to be effective, this interferometric rejection of common mode errors requires that both legs be subject to exactly the same conditions.

Optical fiber interferometric measurements of pressure and fiber interferometric measurements of pressure and variations thereof may be carried out directly with such fibers of suitable construction. These measurements may also be carried out indirectly by arranging a resilient cylinder, which is wound with an optical fiber, for compression resulting from strain of a primary pressure or force measuring element so that lateral expansion of the cylinder lengthens the fiber. These fiber optic arrangements for pressure measurement are effective and adapted to push-pull operation, but are somewhat limited in sensitivity and existing designs have push-pull optical fiber legs separated spatially and thermally to an undesirable extent.

SUMMARY OF THE INVENTION

It is, therefore, an object of the present invention to provide a hydrophone or other acoustic vibration sensor which has great sensitivity and yet has minimal errors due to temperature, pressure, and acceleration.

Another object is to provide such a sensor which utilizes a fiber optic interferometer having a pair of legs in a push-pull arrangement to provide sensitivity and minimize errors while providing convenient connection to remote interferometric sources and detectors.

Still another object is to provide such a sensor which is rugged, easily constructed, and fully effective for pressure measurements under a variety of conditions.

These and other objects and advantages are provided by an acoustic vibration sensing apparatus of the present invention wherein an elastic disk is circumferentially supported in contact with a fluid for flexure in an axial direction due to acoustic vibrations in the fluid. The disk is wound with a pair of flat spirals of optical fiber, each spiral being fixedly attached to the corresponding disk side so that the temperature of the spirals is substantially the same and so that flexure of the disk due to differential pressure across it induced by the acoustic vibrations in the fluid lengthens the spiral on one side and shortens the spiral on the other side. The spirals are connected as two legs of a fiber optic interferometer to provide an output corresponding to the vibrations. The steady state ambient pressure on the spirals may be equalized by mounting the disk on a vented body. A pair of the disks and associated optical fiber spirals may be mounted on opposite ends of a body with the outer spirals connected as one interferometer leg and the inner spirals as another leg, thereby canceling differences in the lengths of the legs due to acceleration induced flexure of the disks.

BRIEF DESCRIPTION OF THE DRAWINGS

The features of the present invention will be apparent from the following detailed description of the invention when considered in conjunction with the accompanying drawings wherein:

FIG. 1 is an axial view of a flexural disk fiber optic hydrophone embodying the principles of the present invention;

FIG. 2 is a longitudinal section of such a hydrophone, which has a single flexural disk and associated optical fibers, taken on line 2—2 of FIG. 1;

FIG. 3 is an enlarged fragmentary view of the portion of the hydrophone indicated by a circle in FIG. 2, the disk being flexed as when exposed to a pressure differential;

DETAILED DESCRIPTION

First Embodiment

Figures 4, 5:
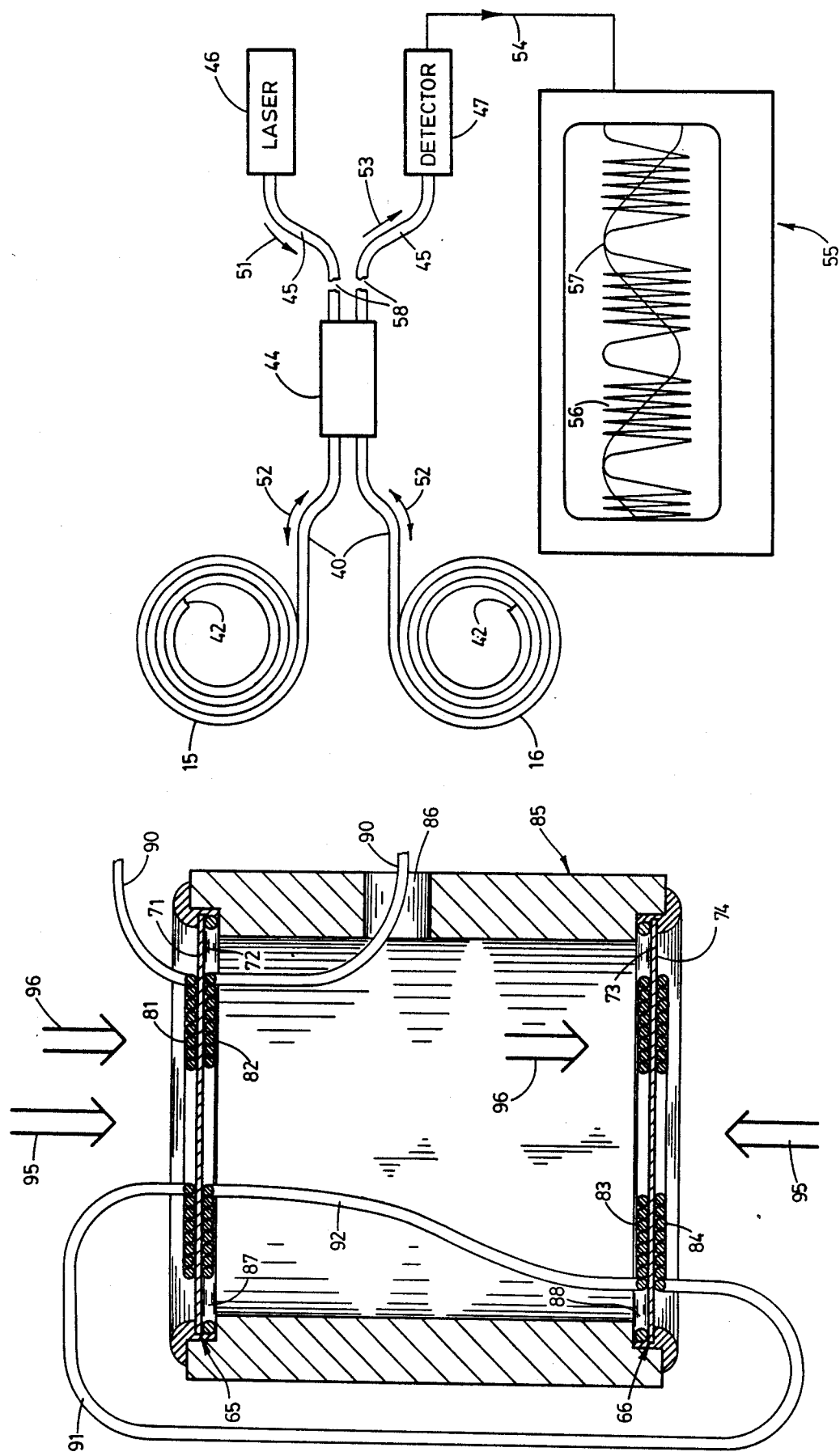
FIG. 4 is a diagram of an optical fiber interferometer which may be used advantageously with the hydrophone.
FIG. 5 is a longitudinal section of a second such hydrophone having a pair of flexural disks and associated optical fibers.

Referring more particularly to the drawings, FIGS. 1–3 show a hydrophone or fluid acoustic vibration sensor which is a first embodiment of the subject invention and has a single flexural elastic disk 10 having a pair of axially opposite sides 11 and 12. Disk 10 is planar and is axially flexible so that a differential pressure axially across the disk, indicated in FIG. 3 as being greater at side 11 by arrow 13, bends or deflects the disk axially so that one side, side 11 in FIG. 3, is concave while the other side is convex. Such a differential pressure may, of course, be one phase of pressure differences in a fluid contacting one or both of sides 11 or 12 and corresponding to acoustic vibrations of the fluid so that disk 10 flexes in accordance with the vibrations. As shown in FIGS. 2-4, sides 11 and 12 bear respective planar spirals 15 and 16 each wound from a length 17 of optical fiber and fixedly connected or bonded in any suitable manner to the corresponding side 11 or 12 along all of length 17 so that each spiral undergoes the same strain as the side of the disk to which the spiral is connected. Spiral 16 on convex side 12 thus increases in length due to differential pressure 13 while spiral 15 on concave side 11 decreases in length, such variations in length corresponding to such acoustic vibrations. Preferably, spirals 15 and 16 are of substantially equal length, are substantially concentric with disk 10 and with each other, and are wound with adjacent turns touching. For illustrative convenience, the diameter of the fiber forming spirals 15 and 16 is depicted as relatively larger in relation to the dimensions of disk 10 than is typically the case.

It is apparent that, since spirals 15 and 16 are bonded along their entire lengths to disk 10, the optical fibers forming these spirals and the disk are connected in thermally conducting relation, especially when disk 10 is metallic, as is typically the case. The temperature of the optical fibers forming spirals 15 and 16 will thus be substantially the same so that the effect of temperature differences on the relative optical lengths of the spirals will be minimized when the spirals are connected as a pair of interferometer legs as shown in FIG. 4 and subsequentially described.

It is also apparent that, while a sensor having the depicted configuration of disk 10 and spirals 15 and 16 is simple to construct and provides relatively high sensitivity and freedom from common mode errors, the present invention includes variations such as the use of a flexural element which is not circular or which is axially bowed when there is no pressure differential. Other such variations include an optical fiber spiral conforming to such a noncircular or bowed element, the use of a single optical fiber spiral, and the use of such a spiral which has spaced turns, turns alternating with turns of another spiral, or multiple optical fiber spirals disposed in layers.

The sensor has a cylindrical, cup-like body 20 best shown in FIG. 2 and having an open end at which disk 10 is circumferentially and coaxially supported for contact on its side 11 with a fluid having acoustic vibrations to be sensed and for axial deflection by net axial differential pressure 13 due to the acoustic vibrations. Typically, body 20 has through it radially a port 22 so that the interior of the body is filled with the fluid in contact with disk side 12 and the interior of body is at the ambient pressure to support disk 10 thereagainst. Port 22 is of relatively small diameter to damp out such acoustic vibrations interiorly of body 20. The interior of body 20 may, however, be sealed from the fluid and evacuated or filled with a different fluid. In this case a port, similar to port 22, may be provided for penetration of body 20 by optical fibers subsequently to be described, the port being sealed about the fibers.

Referring now to FIGS. 2 and 3, where the latter figure shows at an enlarged scale the portion of FIG. 2 in circle 23, it is seen that the open end of body 20 defines an opening 24 which has a width less than the diameter of disk 10, and the body of counterbored configuration so as to provide an annular planar surface 25 circumscribing opening 24 and extending transversely thereof. The outer diameter of surface 25 is somewhat greater than the diameter of disk 10 so that the disk may be received at the surface with the circumferential portion of disk side 12 facing the surface. Preferably, disk 10 is substantially simply supported around its circumference on body 20, such support being provided by a toroidal ring 27 of glass fiber disposed between and oppositely engaged by such circumferential portion and the annular surface. The body, the ring, and the disk are secured together in any suitable manner, not shown, as by epoxy adhesive applied to the ring. The joint between disk 10 and body 20 may be sealed in any suitable manner as by an annular application of silicone rubber 29, which may also be extended to encapsulate the body. A sensor embodying the principles of the present invention may also be constructed with a disk similar to disk 10 having its circumference clamped in any suitable manner to a body similar to body 20.

Referring in greater detail to spirals 15 and 16 of optical fiber as shown in FIGS. 1,2, and 4, it is seen that the fiber from which each spiral is wound has an extension 40 from the outer turn of the corresponding spiral, such extension of spiral 16 passing through port 22 to the exterior is of body 20. Spirals 15 and 16 are connected by extensions 40 thereof as the legs of a Michelson interferometer as shown in FIG. 4., a Michelson interferometer being preferred to other forms of interferometer because of sensitivity and need for only one connection to each spiral. Such interferometric use of optical fibers is well-known and will be only briefly described. Each spiral 15 and 16 terminates at its inner turn in a broken and thus sufficiently reflective end 42 shown in FIG. 4. Since the reflectivity of an end 42 may be adversely affected by the adhesive used to affix the corresponding spiral to disk 10, the end is, typically, protected by a cap 43, FIG. 1, before mounting the spiral on the disk. Extensions 40 are joined at one end of a 3 dB coupler 44 from the other end of which a pair of leads 45 of optical fiber extend individually to a laser 46 and to a detector 47. Light from laser 46 is indicated by arrow 51. As indicated by double headed arrows 52, this light is transmitted via coupler 44 to spiral fiber ends 42 and reflected back to the coupler and combined thereat to generate light having variations in intensity due to interference fringes corresponding to variations of the relative length of spirals 15 and 16, the varying light due to these fringes being transmitted to detector 47 as indicated by arrow 53. Detector 47 converts such light variations to corresponding variations in an electrical signal 54 for any suitable use such as display by a conventionally represented CRT 55 on which lines 56 represent such fringes due to a sine wave 57 corresponding to fluid acoustic vibrations induced in disk 10. It is apparent that, as conventionally indicated by breaks 58, leads 45 may be relatively long so that laser 46 and detector 47 may be remote from a sensor of the present invention.

Second Embodiment

An acoustic vibration sensor which is a second embodiment of the present invention is shown in FIG. 5 and is characterized by having a pair of disks 65 and 66 each of which may be substantially identical to disk 10, disk 65 having opposite sides 71 and 72 and disk 66 having opposite sides 73 and 74. Sides 71 through 74 have affixed thereto respective optical fiber spirals 81 through 84, the pair of spirals of each disk 65 and 66 having the same configuration and relation thereto as spirals 15 and 16 have to disk 10. The sensor of the second embodiment has a cylindrical body 85 having a port 86 corresponding to port 20 and having opposite open ends 87 and 88 which are of counterbored configuration similar to the open end of body 20. Ends 87 and 88 receive, respectively, disks 65 and 66, these disks being attached and sealed to body 85 in the same way disk 10 is attached an sealed to body 20 so that disks 65 and 66 are disposed in coaxial and axially spaced relation. Disk sides 71 and 74 face axially oppositely of each other and outwardly of body 85 and are thus subjected to the same phase of a fluid pressure variation having a wavelength long in relation to the size of the sensor.

Spirals 81 and 82 have individual fiber optic extensions 90 corresponding to extensions 40 and similarly connectable to a Michelson interferometer coupler similar to coupler 44 and located interiorly or exteriorly of cylinder or in port 86. The inner turns of spirals 83 and 84 have reflective ends, not shown, corresponding to ends 42 of spirals 15 and 16. However, the inner turn of spiral 81 is optically connected in series to the outer turn of spiral 84 by an optical fiber 91, and the inner turn of spiral 82 is optically connected in series to the outer turn of spiral 83 by an optical fiber 92. Spirals 81 and 84 are thus disposed on axially oppositely facing sides of disks 65 and 66 and are connected as one leg of an interferometer, and spirals 82 and 83 are correspondingly but oppositely disposed and are connected as another leg of the interferometer.

As a result of these connections of spirals 81-84, an increasing pressure phase, which is due to acoustic vibrations in the fluid surrounding the sensor and is indicated by arrows 95, deflects disks 65 and 66 inwardly of body 85 so that spirals 81 and 84 shorten together and spirals 82 and 83 lengthen together. Conversely, a decreasing pressure phase lengthens spirals 81 and 84 together and shortens spirals 82 and 83 together. The sensor of FIG. 5 is thus twice as sensitive to pressure changes as the sensor of FIG. 2. However, acceleration forces, which act axially of body 85 of the FIG. 5 sensor as indicated by arrows 96, cause spirals 81 and 83 to shorten while spirals 83 and 84 lengthen correspondingly. As a result, the lengths of the interferometer legs, one leg formed by spirals 81 and 84 and the other leg by spirals 82 and 83, are substantially unaffected by acceleration of the sensor.

EXAMPLE

An acoustic vibration sensor of the present invention and corresponding to that of FIGS. 1-3 was constructed with an aluminum disk, corresponding to disk 10, of 3.0 mm thickness and 4.0 cm radius machined from 6061-T6 bar stock. The disk was provided with an optical fiber spiral measurement leg, corresponding to spiral 15, of 1.5 cm inner radius and 2.5 cm outer radius. This spiral was wound from a 10 meter length of 80 $\mu$m single mode fiber having a jacket diameter of about 200 $\mu$m. A corresponding 10 m reference leg was utilized, but not wound on the disk.

The boundary conditions of the disk were investigated by deflecting the disk and comparing its displacement and strain with that calculated by methods well-known to those in the art of acoustics and plate vibrations. The disk was deflected by a partial vacuum applied through a port corresponding to port 20 and giving a pressure differential of up to 1 atm ($10^5$ PaO). The displacement was measured by an optical displacement sensor and found to be $8.2 \times 10^{-10}$ m/Pa, the calculated displacement being $8.7 \times 10^{-10}$ m/Pa for a simply supported disk and $2.2 \times 10^{-10}$ m/Pa for a clamped disk. An electrical resistance strain gauge was appled to the disk 2 cm from its center and the measured change of resistance with pressure differential of $0-10^5$ Pa was linear and corresponded to a strain of $1.62 \times 10^{-9}$/Pa, the calculated strain for a simply supported disk being $1.88 \times 10^{-9}$. The disk was thus substantially simply supported.

The sensitivity of the sensor was then determined by sensitivity of the sensor was then determined by connecting the optical fiber spiral wound on the disk and the reference leg as the legs of a Michelson interferometer system as shown in FIG. 4 and by subjecting the sensor to atmospheric acoustic vibrations using a well-known acoustic plane wave calibrator at frequencies below the resonance frequency of the disk.

The normalized sensitivity of such sensor of the present invention below 1000 Hz and measured as radians per radian length of the 10 m spiral and per uPa was determined to be about $-295$ dB. This is substantially greater than the corresponding sensitivity of typical acoustic vibration sensors which use an optical fiber wrapped around a resilient mandrel and have a projected sensitivity of about $-308$ dB. The sensitivity of the sensor of the present invention is even greater in comparison with the corresponding sensitivity of acoustic vibration sensors which use the direct pressure on a coated fiber and a Mach-Zehnder interferometer and which have a maximum sensitivity of $-320$ dB.

The following equations derived from fundamental relations for the deflection of a disk by differential pressure, for the resonance frequency of a disk, for the geometry of a fiber spiral on such a disk, and for the sensitivity of an optical fiber interferometer are helpful in designing an acoustic vibration sensor of the present invention. In these equations, which show that the product of the optical sensitivity and square of the disk resonant frequency are a constant dependent only on the materials of the disk and of the fiber for a single disk, dual optical fiber sensor having the outer diameter of the spiral equal to the disk diameter: M is the optical sensitivity, phase change in radians per unit change in pressure; F is the resonant frequency; K is the wave number in glass and is $2\pi N/L$, 2 being a factor for a Michelson interferometer, N being the index of refraction in the fiber core, and L being the vacuum wavelength of the laser; $\nu$ is Poisson' ratio for the disk; R is the disk density; and D is the fiber diameter. For a simply supported disk:

$$MF^2 = 0.125 \frac{K(5 + \nu)}{RD(1 - \nu)}$$

and for a clamped edge disk:

$$MF^2 = 0.52 \frac{K}{RD}$$

Obviously many modifications and variations of the present invention are possible in light of the above teachings. It is, therefore, to be understood that the present invention may be practiced within the scope of the following claims other than as specifically described.

What is claimed is;

1. A sensor for acoustic vibrations in a fluid, the sensor comprising:
   an elastic element having opposite sides;
   body means for peripherally supporting said element in contact with the fluid so that said vibrations induce deflections of said element corresponding to the vibrations; and an optical fiber fixedly connected to one side of said element and wound thereon in a spiral so that said deflections induce in the fiber variations in length corresponding to said vibrations for interferometric measurements of said variations in length.

2. The sensor of claim 2 wherein said element is a disk, wherein the body means supports the disk for such deflections in a direction axially of the disk, and wherein the spiral is substantially concentric with the disk.

3. The sensor of claim 1 wherein the optical fiber is one of a pair of such fibers corresponding individually to said sides of said element and connectable as a pair of legs of an interferometer.

4. The sensor of claim 1 wherein:
said element is one element of a pair of such elements;
said optical fiber is one fiber of a pair of such fibers corresponding individually to each of said elements;
said body means supports said pair of elements in spaced and generally aligned relation along a predetermined axis so that one of said sides of each of said elements faces oppositely of the element from the other of said elements for contact with said fluid, so that an increase in pressure of the fluid due to said vibrations deflects said elements in a direction along said axis opposite to a direction said elements are deflected by a decrease in such pressure due to said vibrations and so that acceleration of the sensor along said axis deflects said elements in the same direction therealong; and
said pair of fibers corresponding individually to the disks are optically connected in series and are disposed on axially oppositely facing sides thereof, whereby such an increase or decrease in pressure results in a corresponding change in length of each fiber of said pair and such acceleration results in substantially no change in said length.

5. A sensor for acoustic vibrations, the sensor comprising:
a pair of optical fibers wound to form a pair of generally planar spirals 1 corresponding individually to the fibers and of substantially equal length;
an elastic disk, the disk being axially flexible and having a pair of axially opposite sides, each side having a fiber of said pair thereof disposed thereon concentric with the corresponding spiral and fixedly attached to said side along the length of said spiral so that said length increases when the disk flexes convexly at said side and decreases when the disk flexes concavely at said side;
interferometer means having said fibers in a pair of legs thereof for providing an output signal corresponding to differences in length of the fibers due to flexing of the disk; and
a body supporting said disk around the circumference thereof for subjection of the disk to differential pressure variations axially thereof due to said vibrations so that the disk flexes axially in accordance therewith and the interferometer means provides such output signal corresponding to the vibrations.

6. The sensor of claim 5 wherein said disk and said pair of optical fibers are connected in thermally conducting relation so as to be at substantially the same temperature to minimize the effect of temperature on the optical length of said pair of legs of the interferometer means.

7. The sensor of claim 5 wherein the sensor comprises a pair of said disks each having such opposite sides and such an attached pair of spirals of optical fiber, and wherein the body supports said disks in coaxial and axially spaced relation so that the sensor has a pair of outward such sides corresponding individually to each of said disks, facing away from the other of said disks, and subjected to substantially the same phase of said pressure variations and has a pair of outward such optical fibers attached individually to said outward sides, said outward optical fibers being optically connected in series as such a leg of said interferometer means so that said outward fibers lengthen or shorten said leg simultaneously during each such phase and so that one of the outward fibers lengthens while the other thereof shortens during acceleration of the sensor axially of said disks, whereby the length of said leg is substantially constant during such acceleration.

8. The sensor of claim 5 wherein:
the body defines an opening having a width less than the diameter of said disk and has a planar surface circumscribing the opening and extending transversely thereof;
the disk extends transversely of said opening and has a circumferential portion facing said surface; and
the sensor further comprises
a generally toroidal ring disposed between and oppositely engaged by said surface and said circumferential portion, and
means for adhesively connecting said ring to said surface and to said circumferential portion so that the disk is simply supported on the body.

9. A sensor for acoustic vibrations in a fluid, the sensor comprising:
a pair of elastic elements, each of said elements having a pair of opposite sides;
body means for peripherally supporting said elements in spaced and generally aligned relation along a predetermined axis so that:
one of said sides of each of said elements faces oppositely of the element from the other of said elements for contact with the fluid and said vibrations induce deflections of said element corresponding to the vibrations, and
a change in pressure of the fluid due to said vibrations deflects said elements in opposite directions along said axis and acceleration of the sensor along said axis deflects said elements in the same direction therealong; and
a pair of optical fibers, each of said fibers being fixedly connected to one side of one of said elements and in series to one side of the other of said elements and being wound on each of said elements in a spiral so that said deflections induce in the fiber variations in length corresponding to said vibrations for interferometric measurements of said variations in length, said fibers being disposed on axially oppositely facing sides of said elements so that such an increase or decrease in pressure results in a corresponding change in length of each fiber and such acceleration results in substantially no change in said length.

10. A sensor for acoustic vibrations, the sensor comprising:

a pair of optical fibers, each of said fibers being wound to form a pair of generally planar spirals of substantially equal length;

a pair of elastic disks, each disk being axially flexible and having a pair of axially opposite sides, each of said sides having one of said spirals disposed concentrically on the side and fixedly attached thereto so that the length of the spiral increases when the disk flexes convexly at said side and decreases when the disk flexes concavely at said side;

interferometer means having said fibers in a pair of legs thereof for providing an output signal corresponding to differences in length of the fibers due to flexing of the disks; and a body supporting each of said disks around the circumference thereof for subjection of the disk to differential pressure variations axially thereof due to said vibrations so that the disk flexes axially in accordance therewith and the interferometer means provides such an output signal corresponding to the vibrations, the body supporting said disks in coaxial and axially spaced relation so that:

the sensor has a pair of outward such sides which correspond individually to each of said disks, which face away from the other of said disks, and which are subjected to substantially the same phase of said pressure variations, and the sensor has a pair of outward such spirals attached individually to said outward sides, said outward optical spirals being optically connected in series as such a leg of said interferometer means so that said outward spirals lengthen or shorten said leg simultaneously during each such phase and so that one of the outward spirals lengthens while the other thereof shortens during acceleration of the sensor axially of said disks, whereby the length of said leg is substantially constant during such acceleration.

11. A sensor for acoustic vibrations causing pressure variations having a predetermined wavelength in a fluid, the sensor comprising:

a body defining a first open end and defining a second open end disposed oppositely of the body from said first open end and spaced therefrom a distance which is short in relation to said wavelength;

a first elastic element extending across said first open end and a second elastic element extending across said second open end so that acceleration of the sensor in a direction between said elements deflects said first element and said second element in the same direction, each of said elements having an outer side facing outwardly of said body and oppositely of the other of said elements and having an inner side facing inwardly of said body and toward the other of said elements, each outer side being subject to said pressure variations so that an increasing pressure variation deflects each of said elements toward the other of said elements and a decreasing pressure variation deflects each of said elements away from the other of said elements;

a first optical fiber disposed on the outer side of said first element, a second optical fiber disposed on to the inner side of said first element, a third optical fiber disposed on the inner side of said second element, and a fourth optical fiber disposed on the outer side of said second element; each fiber being connected to the corresponding side of one of said elements so that deflection of the element toward the side lengthens the fiber and deflection of the element away from the side lengthens the fiber; and means for connecting said first fiber and said fourth fiber optically in series as a first leg of an interferometer and for connecting said second fiber and said third fiber optically in series as a second leg of the interferometer so that the length of said first leg and the length of said second leg change oppositely during such a pressure variation and so that the length of said first leg and the length of said second leg change correspondingly during acceleration of the sensor in a said direction between said elements.

12. The sensor of claim 11 wherein:

each of said elastic elements is a circular disk, said elements are disposed in coaxial and axially spaced relation, and each such side is an axially facing side of the corresponding disk; and each of said optical fibers is planar spiral substantially concentric with the corresponding such side and fixedly connected thereto so that the spiral undergoes substantially the same strain as the side.

* * * * *